United States Patent [19]
Grass

[11] Patent Number: 5,489,148
[45] Date of Patent: Feb. 6, 1996

[54] PARTITION WALL COMPONENT TO THE DRAWER DIVISION OF THE DRAWER

[75] Inventor: Alfred Grass, Höchst/Vlbg., Austria

[73] Assignee: Grass AG, Hochst/Vlbg., Austria

[21] Appl. No.: 439,703

[22] Filed: May 12, 1995

Related U.S. Application Data

[63] Continuation of Ser. No. 134,061, Oct. 12, 1993, abandoned.

[30] Foreign Application Priority Data

| Oct. 26, 1992 | [DE] | Germany | 42 35 968.6 |
| Nov. 11, 1992 | [DE] | Germany | 42 37 968.7 |

[51] Int. Cl.⁶ .................................................. A47B 88/20
[52] U.S. Cl. ...................... 312/348.2; 403/231; 403/263; 312/348.3
[58] Field of Search ..................................... 312/190, 192, 312/193, 348.1, 348.2, 348.3, 348.5, 183; 403/263, 231

[56] References Cited

U.S. PATENT DOCUMENTS

| 3,140,522 | 7/1964 | Prout | 403/263 |
| 3,687,512 | 8/1972 | Alston | 312/348.2 |
| 4,063,836 | 12/1977 | Militano | 403/263 |
| 5,209,598 | 5/1993 | Züllig | 403/231 |
| 5,312,180 | 5/1994 | Tieder et al. | 312/348.3 |

FOREIGN PATENT DOCUMENTS

| 0384343 | 8/1990 | European Pat. Off. | 312/348.2 |
| 2944683 | 5/1981 | Germany | 312/348.3 |

Primary Examiner—James R. Brittain
Assistant Examiner—David E. Allred
Attorney, Agent, or Firm—Petree Stockton

[57] ABSTRACT

A partition wall component for connecting a drawer partition wall to a drawer side wall is fastened to the hollow front face of the partition wall and is detachable from the partition wall. The partition wall component is resiliently fastened to the side wall at a depression formed in the side wall and is fastened to the partition wall by one or more springs firmly engaged against the inner profile of the partition wall.

8 Claims, 3 Drawing Sheets

1

PARTITION WALL COMPONENT TO THE DRAWER DIVISION OF THE DRAWER

This application is a continuation of application Ser. No. 08/134,061, filed Oct. 12, 1993, (now abandoned).

FIELD OF THE INVENTION

The present invention relates to partition wall components of drawers.

DESCRIPTION OF THE RELATED ART

Examples of similar partition wall components are found in GB-PS 1 081 023. There, the partition wall component was designed with a thin-walled profile that mutually produces the same height so that each component is designed with a frontal form-fitting connection with the same type of component or with the side wall. It is not apparent from GB-PS 1 081 023 that the lower part (base) components are firmly coupled to the front face at the drawer side wall and releasable without tools. A disadvantage of the modular design disclosed in GB-PS 1 081 023 is the large expense associated with changing the compartment and with removing the partition wall for cleaning purposes.

OBJECTS OF THE INVENTION

An object of this invention is to provide a partition wall for drawers, with the variable lower parts (bases) of the components between the drawer side walls and/or partition dividers having simple designs to allow compartments to quickly adapt to a respective object, and to facilitate quick removal of the partition wall to make cleaning and transport easier.

It is a further object of the invention to provide a drawer partition wall connector that can be easily manipulated without tools.

SUMMARY OF THE INVENTION

An advantage obtained with this invention is that the partition wall is fastened on its front face, so that both front faces of the drawer side walls comprise systematic connection components. Into these a resilient press piece is inserted, which forms a notched connection with the side wall or another adjoining partition wall.

The notched connection to the side wall is released by twisting the side wall around its long axis. The press piece is thereby pressed out of its resting position in the depression in the side wall.

Another advantage of this invention is the problem free transport of the fastener. Partition walls designed according to the invention can be subsequently delivered or purchased as needed. In particular, the drawers can be shipped unassembled in instances where easy to assemble partition walls are desirable.

When it is indicated in a particular claim that the partition wall on the side wall of the drawer is connected to the invention, the concept "side wall of the drawer" is not to be understood in a restrictive way. This concept encompasses all releasable walls of drawers, (especially partition dividers), which likewise are fastened on clamps, which will be described later. The resilient clamps hold the releasably fastened partition walls.

It is also important that the clamps in the front face of the partition wall is fastened so that a similar component of the partition wall also can be a detachable partition divider or a releasable side, front, or rear panel of a drawer.

It is important in all embodiments of the invention that the connection of the partition wall to the corresponding drawer side wall at the front face of the partition wall is resilient, wherein a resilient press piece is fastened as a clamp in an axial direction with respect to the partition wall. Therefore when the retained partition wall is pushed open, the fastener maintains its resting position in a depression or notch in the drawer side wall.

This type of press piece can be implemented with springs of various types, for example, leaf springs, screw compression springs, spiral springs or other bending springs. Leaf springs are preferably utilized in the press piece. A preferred spreading component consists of a somewhat C-shaped bent leaf spring, which with its curved, resilient designed tabs, fits firmly coupled and form fitting on the inner side of the partition wall. When the partition wall is coupled over the C-shaped arched leaf spring, the leaf spring spreads against the inner profile of the partition wall. Thereby, this is secured against unintentional removal in the axial direction of the partition wall. The C-shaped arch of the leaf spring causes a strengthening of the spreading action by applying an axial tractive power to the partition wall. The partition wall can therefore only be disconnected by turning the leaf spring.

It is also important that the connection between the partition wall and the adjoining side wall of the drawer can be manipulated without tools.

It is also preferred that when the clamp with its press piece is admitted to the side wall in corresponding depressions of the drawer side walls, it is pressed in or screwed in.

The novel aspects of the claimed invention result from not only the matter of the particulars of the protection claims, but also the various combinations of the individual protection claims. All records, documents and evidence, inclusive of the summary, open and disclosed statements and declarations and indications and features, especially those embodiments represented in the drawings, will be claimed as fundamental and significant inventions, to the extent that the technology embodied in the claims individually or in combination is new.

The invention at hand will be explained more precisely by the various explanations shown by the following representational designs and embodiments. Additional significant features and advantages of the invention will be apparent from the drawings and their descriptions.

DETAILED DESCRIPTION OF THE PREFERRED EMBODIMENT

Figure 1:
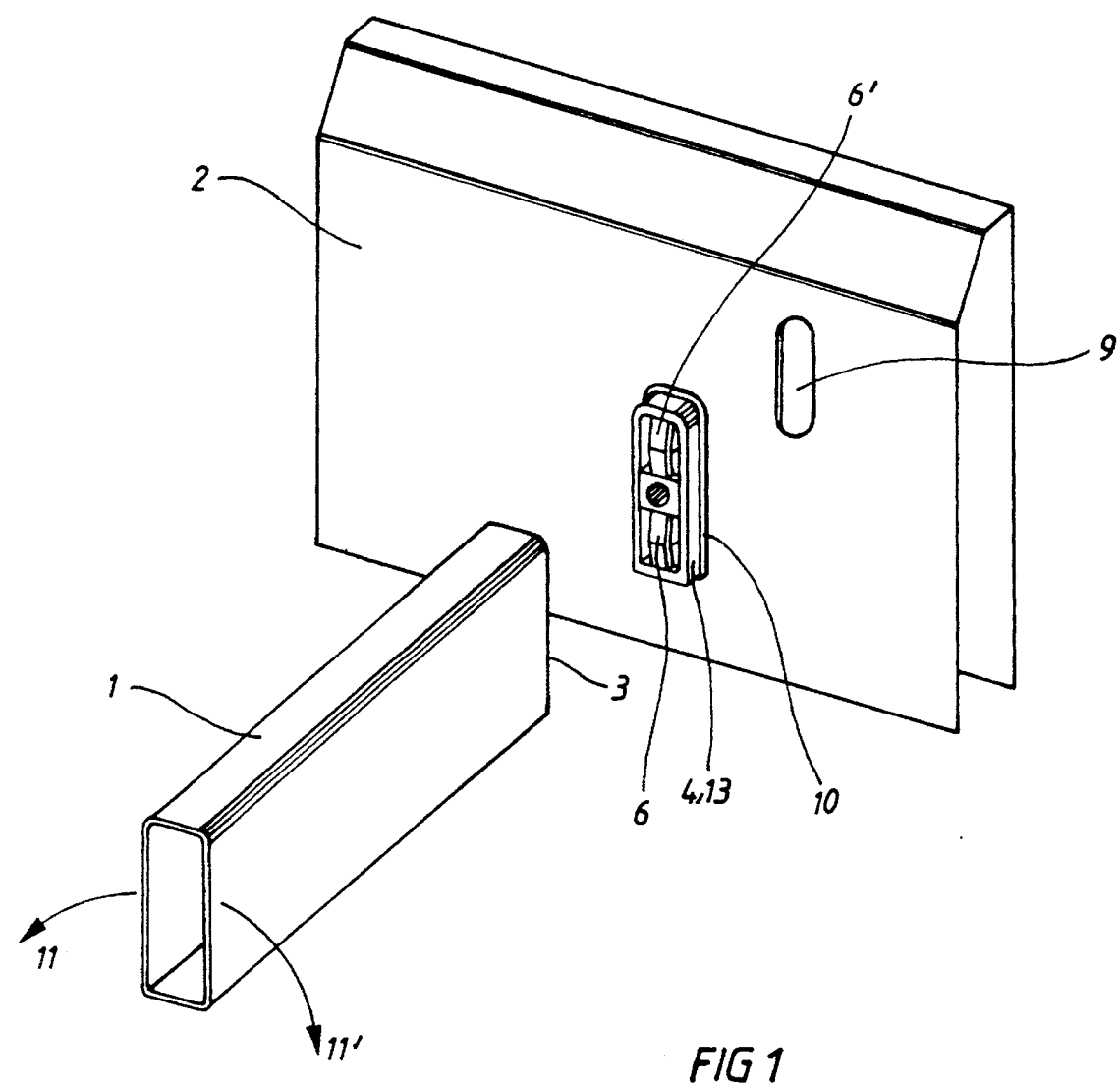
FIG. 1: Perspective exploded view of the fastener from the inner side of the drawer.
Figure 2:
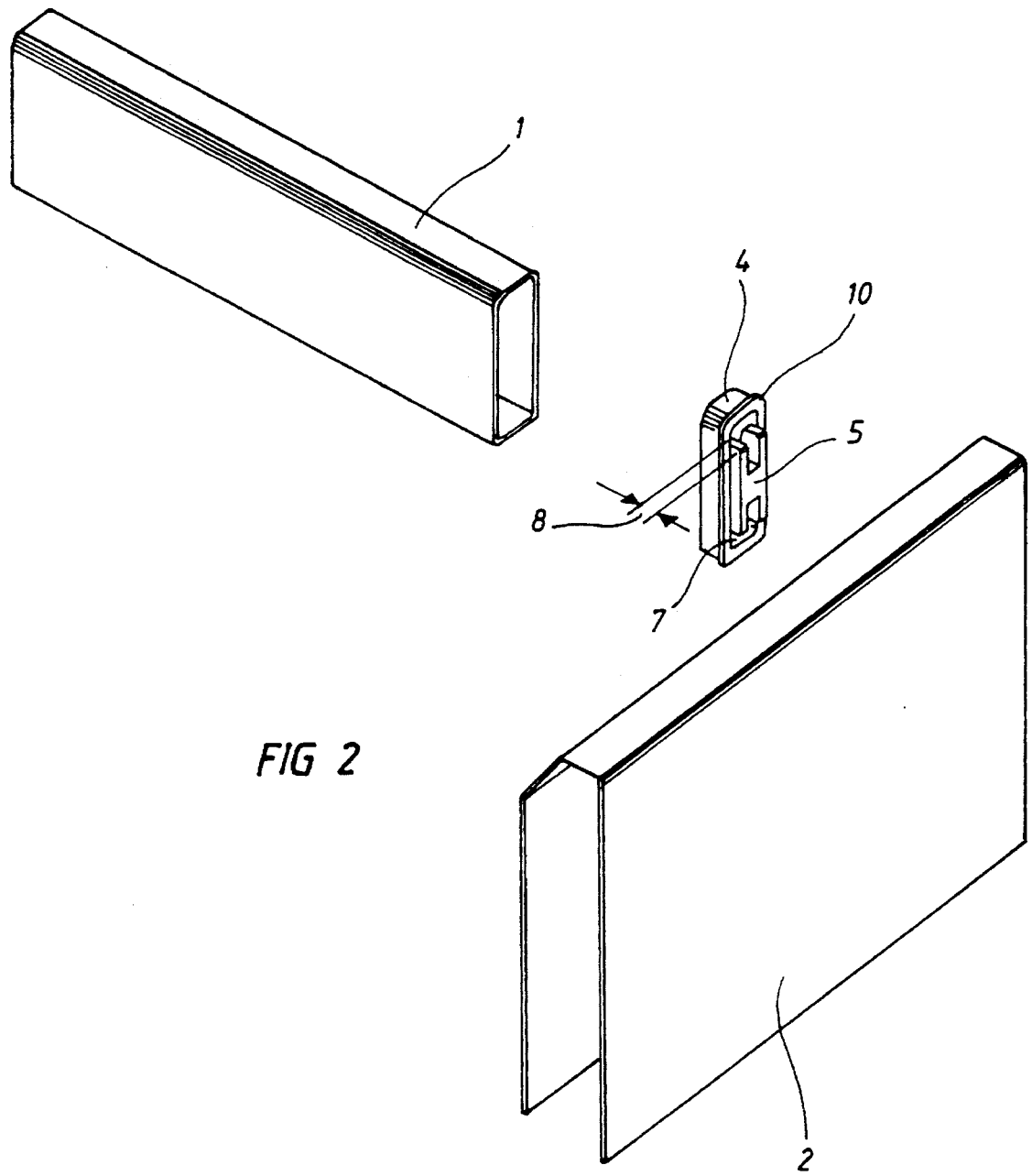
FIG. 2: The same representation as FIG. 1, seen from the exterior side of drawer.
Figure 6:
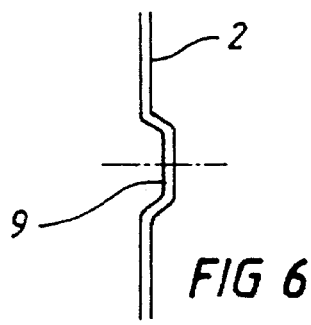
Figure 7:
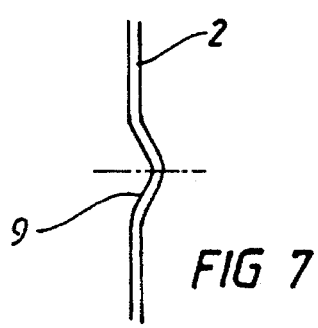

According to FIGS. 1 and 2, a side wall (2) of a drawer is detachably fastened to one of the hollow chamber profiles in a partition wall (1). In addition to this, a clamp (4) is utilized to engage with a depression (9) in the area of the side wall (2) with a resilient press piece. According to FIG. 2, the clamp (4) .inserts rearward into a projecting press piece (5), which is in turn pressed with the clamp into a depression (9). The clamp (4) is fastened in the opened face front (3) of the partition wall (1) and fits firmly coupled and form-fitted to the inner profile of the partition wall (1).

Figure 3:
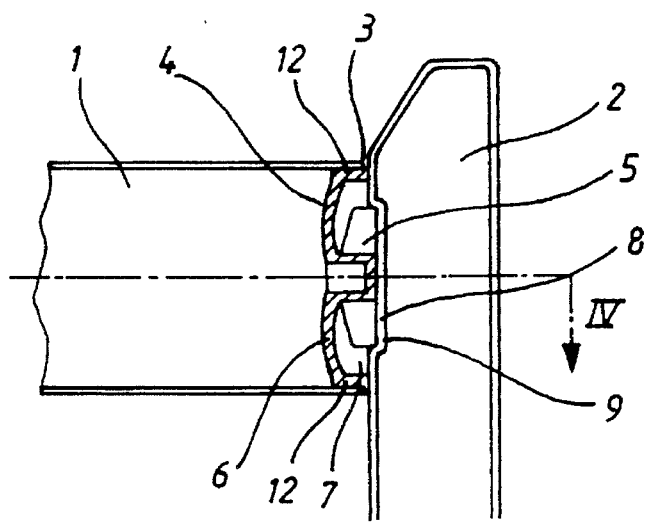
FIG. 3: Section through the connection of the invention in an engaged position.
Figure 8:
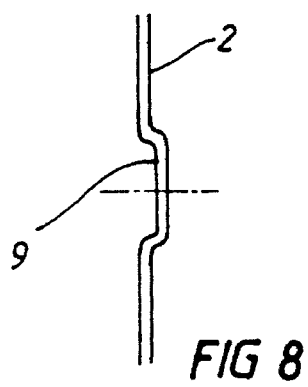
Figure 4:
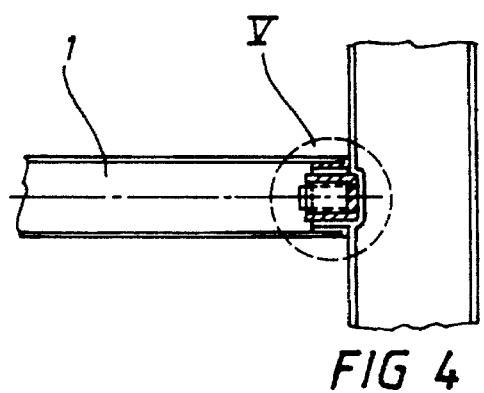
FIG. 4: Section according to line IV in FIG. 3, FIG. 5: An enlargement of the section of FIG. 4, FIGS. 6–9: The representation of various profile forms to the design of the depression in the drawer side wall.
Figure 9:
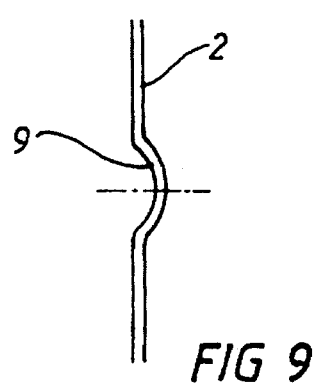

In a preferred design as shown in FIG. 3, the clamp consists essentially of a C-shaped curved leaf spring (6), that forms opposite spring tabs (12). These spring tabs fit firmly against the inner wall of the partition wall (1).

The leaf spring (6), according to FIG. 3, is curved somewhat C-shaped. This results in an enlargement of the spreading action when the partition wall (1) is pulled out in axial direction from the side wall (2).

The leaf spring (6) is fastened and held in the middle of the previously described press piece (5). In turn, press piece (5) is admitted and held in the depression (9) of the side wall.

The clamp (4) is inserted into the clamp cup (7), which preferably comprises a plastic component, whereby the side walls (13) of clamp cup (7) fit the side walls of the inner profile of the partition wall (1).

The clamp cup (7) also corresponds and conforms to the open inner profile of the partition wall (1), whereby the resilient tabs (12) of the leaf springs (6,6'), under spreading action of the upper and lower tabs (12), fit tightly to the sides of the inner profile of the partition wall (1) and are held fast.

Figure 5:
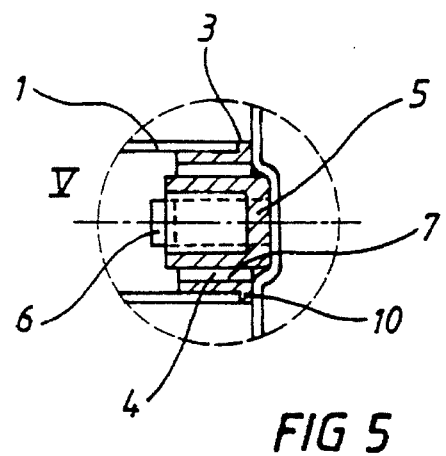

The clamp cup (7) further comprises a circular, encompassing flange (10) larger than the side walls (13), on which the front face of the partition wall (1) rests in an engaged position, according to FIG. 5.

To release the partition wall (1) from the clamp (4), the partition wall is turned in a counterclockwise (turning out) direction 11 or 11', according to FIG. 1. Thereby, the tabs of the press piece (5) tilt in the depression (9), so that the resilient engagement is lifted up and the partition wall (1) can easily be removed.

FIGS. 6 through 9 show various designs for the depression which admits the press piece (5) of the clamp (4). There, the clamp is placed frontally in a capped manner and pressed in.

In further embodiments, it can be anticipated that the leaf springs 6 and 6' with the press piece (5) are designed in one piece and thereby form the entire clamp (4).

Likewise, screw compression springs can be substituted for the leaf springs 6 and 6', corresponding to the explanations of the general description section.

As stated at the beginning, the press piece (5) projects around the area (8) to the back side of the clamp cup (7) and this projecting area can camber frontally, be formed to a point, be angular or faceted, and can be adjusted in the correspondingly designed depressions according to FIGS. 6–9.

The depression (9) can also be designed and implemented as a hole through the side wall (i.e. a perforation).

The shaping of the press piece (5) corresponds to the depressions being correspondingly designed oval or rectangular, so that the clamp (4) is held securely its position against twisting in the depression.

I claim:

1. A partition wall component for connecting a partition wall to a drawer side wall, said partition wall being of the type having a longitudinal axis running from end to end, each of said end being hollow and defining a front face said hollow ends having an inner profile, said drawer side wall having portions defining a depression, the partition wall component comprising:

a clamp detachably engageable within said hollow end of said partition wall and detachably engageable in said drawer side wall depression for connecting said partition wall to said drawer side wall at the hollow front face of the partition wall, said clamp including a spring normally urging a spring clamping force in a direction perpendicular to said longitudinal axis and resiliently engaged within said partition wall hollow end inner profile for normally holding said clamp in said partition wall end, said clamp also including a resilient press piece normally being urged in a direction parallel to said longitudinal axis and resiliently engageable in the side wall depression.

2. The partition wall component according to claim 1, wherein said spring comprises a leaf spring having a free end resiliently engageable against said inner profile of said partition wall.

3. The partition wall component according to claim 1, wherein said spring comprises a compression spring having a free end which fits against said inner profile of said partition wall.

4. The partition wall component according to claim 1, further comprising a clamp cup, wherein said press piece is disposed in the clamp cup, and said spring is fastened on the press piece.

5. The partition wall component according to claim 4, wherein said clamp is engageable in said drawer side wall depression by cooperation between said press piece and said spring.

6. The partition wall component according to claim 5, wherein said press piece and said spring are formed integrally as one piece.

7. The partition wall component according to claim 6, wherein said spring comprises a curved generally C-shaped leaf spring having a free end provided with a bent tab resiliently engageable against said inner profile of said partition wall.

8. The partition wall component according to claim 7, wherein said clamp is detachable from said drawer side wall depression by rotating said partition wall about said longitudinal axis of said partition wall with corresponding rotation of said press piece connected to said leaf spring included in said clamp engaged within the partition wall detaching the press piece from engagement in said drawer side wall depression.

\* \* \* \* \*